Nov. 16, 1954    C. M. ALBRIGHT, JR., ET AL    2,694,335
PHOTOMETRIC ANALYZER
Filed Nov. 23, 1948    3 Sheets-Sheet 1

INVENTORS
CLAYTON M. ALBRIGHT, JR. and
LEO G. GLASSER
BY

ATTORNEY

INVENTORS
CLAYTON M. ALBRIGHT, JR. and
LEO G. GLASSER

ATTORNEY

Nov. 16, 1954  C. M. ALBRIGHT, JR., ET AL  2,694,335
PHOTOMETRIC ANALYZER
Filed Nov. 23, 1948  3 Sheets-Sheet 3

INVENTORS
CLAYTON M. ALBRIGHT, JR. and
LEO G. GLASSER
BY

ATTORNEY

United States Patent Office 2,694,335
Patented Nov. 16, 1954

2,694,335

PHOTOMETRIC ANALYZER

Clayton M. Albright, Jr., and Leo G. Glasser, Wilmington, Del., assignors to E. I. du Pont de Nemours & Company, Wilmington, Del., a corporation of Delaware Application November 23, 1948, Serial No. 61,602

13 Claims. (Cl. 88—14)

This invention relates to devices for photometric analyses and particularly to those devices which are adapted to the continuous analysis of flowing fluid streams including gases, vapors and liquids, which have the property of absorbing a portion of the light of a testing light beam.

According to present theory the physical phenomenon known as light is considered to be a type of electromagnetic radiation which, in its full range, comprehends, in order of increasing wave-lengths, cosmic rays, X-rays, ultraviolet light, visible light, infrared light, radio waves and the relatively long electrical waves which are utilized in induction heating. In general terms of wave-length, ultraviolet light includes electromagnetic radiation ranging from approximately 200 millimicrons (abbreviated $m\mu$) to 400 $m\mu$, visible light 380 $m\mu$ to 780 $m\mu$, and infrared light 700 $m\mu$ to 150 $\mu$. Thus, visible light constitutes only a relatively small portion of the radiation range which possesses at least some of the properties characteristic of visible light radiation.

One of the very useful properties of all light radiation is that of its absorption to a very precise degree by various light transmitting materials, specific materials absorbing light of a specific wave-length in various amounts depending upon the number of molecules of the material, or, if the pressure is maintained constant, on the concentration of the material interposed in the path of the light. The quantitative relationship expressing the variation of light absorption at a given wave-length with material concentration is known as Beer's law, according to which $$I = I_0 e^{-Kcd}$$

where $I$ = the intensity of the light radiation transmitted,
$I_0$ = the intensity of incident light radiation,
$e = 2.716$, the natural logarithmic base.
$K$ = a constant for the absorbing material, known as the extinction coefficient for unit concentration at the wave-length of the incident radiation,
$c$ = the concentration of the material,
$d$ = the length of the sample through which the radiation passes.

If the fraction of incident light transmitted by the material is designated by T it follows that $$T = \frac{I}{I_0} = e^{-Kcd}$$

or A, the fraction of the incident light absorbed $$= \frac{I_0 - I}{I_0} = 1 - e^{-Kcd}$$

It will be understood that Beer's law is equally applicable to mixtures of materials wherein only one component possesses light absorptive properties for the particular wave-length of radiation transmitted as well as to the case where only a single light absorbing material is present.

The foregoing relationships afford a useful means for the analysis of light transmitting liquid and gaseous systems by the measurement of transmitted light radiation and have been widely utilized for this purpose.

It is an object of this invention to provide an improved means for photometric chemical analyses.

Another object of this invention is to provide a device of high inherent sensitivity for photometric chemical analyses.

Another object of this invention is to provide a continuous means for the analysis of flowing streams of fluids by the measurement of their light transmission values.

Another object of this invention is to provide an automatic device capable of determining and recording the concentrations of fluids by the measurement of their light transmission values.

Another object of this invention is to provide a mechanical device adapted to the measurement of light transmission over a relatively wide range of wave-lengths, comprising ultraviolet, visible and infrared radiation.

Another object of this invention is to provide an automatic device for the determination and indication of concentrations of fluids embodying self-purging and rebalancing features to insure continued accuracy in analyses.

Another object of this invention is to provide a rugged, continuous, photometric analyzer suited for use under ordinary manufacturing plant conditions.

Further objects of this invention will become apparent upon consideration of the description illustrated by the accompanying drawings wherein—

Figure 2 is a plot of the variation of light absorption of chlorine gas with concentration expressed in percent by volume, the other component being air, at a wave-length of substantially 365 $m\mu$ and therefore is a graphical representation of the expression $$A = \frac{I_0 - I}{I_0} = 1 - e^{-Kcd}$$

for the chosen material and wave-length for a constant sample cell length of $\frac{1}{2}''$.

Figure 1:
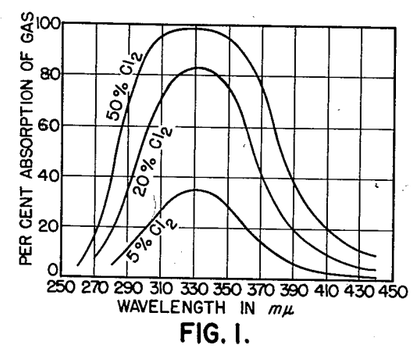
Figure 1 is a plot of the variation of light absorption of various concentrations of chlorine gas, expressed in percent by volume, in air with wave-length over the range of 250–450 $m\mu$ radiation for a constant sample cell length of $\frac{1}{2}''$.

Referring to Figure 1, the absorption of radiation by chlorine gas has been determined experimentally at light wave-lengths ranging from ultraviolet radiation at 250 mμ into the visible light range of 430 mμ, and the extent of absorption indicated by the three curves secured for a constant one-half inch sample thickness of 5%, 20% and 50% chlorine concentration in air at atmospheric pressure and 0° C. As shown by these curves the absorption of light, and conversely the light transmission, varies widely at radiations of different wave-lengths and also for different concentrations of the material interposed in the light path. It has been found that the light absorption-radiation curves for different materials have different shapes and frequently overlap. However, by the careful selection of narrow radiation bands through the use of suitable light filters and associated light sources, it is usually possible to segregate radiation which is primarily responsive to a single material. When the latter condition is achieved it will be apparent that light absorption (or transmission) will thereafter depend solely upon the concentration of the material being analyzed for, and measurements of variations in the light emergent from the sample cell provide a convenient method for the determination of variations in material concentrations.

Figure 2:
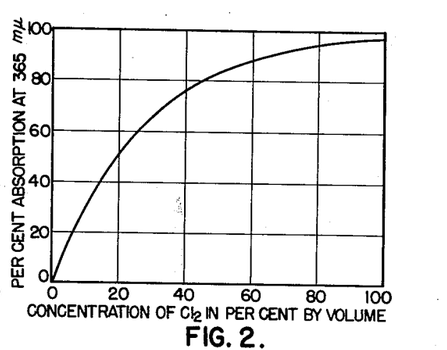

A typical graphical representation of the variation of light absorption with material concentration is exemplified by the curve of Figure 2 for chlorine gas diluted with air when examined at the substantially monochromatic wave-length of 365 mμ. It will be noted that the slope of this curve decreases with increasing material concentration and that the sensitivity of the absorption method of analysis decreases correspondingly at higher concentration levels. The same graphical relationship will result if, instead of varying material concentrations, the thickness of the sample layer is varied while a constant material concentration is preserved, whereupon it will be understood that it is necessary to employ a sample cell of constant dimensions in analytical light absorption investigations.

The control of radiation to secure light of a particular quality suitable for the analysis of the particular material involved depends upon the selection of both a suitable radiation source and an associated optical filter of a type which will permit the passage of a relatively narrow band of light and screen out all light not within the preselected range desired. As is well known in the art, glowing carbons or metal rods maintained at dull red heat emit light primarily in the infrared band, tungsten and other incandescent lamps emit light in the visible light band, and mercury vapor lamps emit large portions of light in the ultraviolet band. A wide variety of light filters can be prepared or are commercially available for matching with the particular light source chosen. As an example, if it is desired to secure an analytical light of a wave-length of substantially 365 mμ, as was necessary for the preparation of the curve of Figure 2, a mercury-vapor lamp producing peak lines of radiation at 254, 313, 365, 405 and 436 mμ and higher wave-lengths may be utilized as the light source in conjunction with a Corning glass filter No. 5840. This filter will transmit over 50% of the radiation of 365 mμ wave-length, while screening out almost all radiation below 315 mμ and above 395 mμ, thus confining the resultant radiation to the 365 mμ emission region generated by the source. An almost infinite number of light source-filter combinations are effective for the control of light quality, as will be understood by persons skilled in the art and will therefore not be discussed further herein.

A relatively wide variety of detection devices for use with the preselected radiation chosen for the particular system under investigation are commercially available. Infrared radiation is readily detected by resistance bolometers, thermopiles and other devices, while near infrared, visible and ultraviolet radiation may be detected by either barrier-layer type photocells, or gas filled or vacuum-type phototubes. The photometric analyzer of this invention is intended for use in the range of light wave-lengths varying from about 250 mμ to about 1250 mμ wherein vacuum-type phototubes have proved to be entirely satisfactory as detectors.

This invention will be described with particular application to vacuum-type phototube radiation detection, it being understood that other means of light detection are suitable for use when operation is to be conducted at various relatively narrow wave-lengths within the broad range hereinbefore specified. Vacuum-type phototube detection is particularly preferred, however, because commercial types are presently available which are effective over the entire gamut of radiation corresponding to the operating range of the analyzer of this invention. Furthermore, the operating characteristics of vacuum-type phototubes are such that very high sensitivity, high stability and long operating life may be realized when these devices are employed for radiation detection in accordance with this invention. Vacuum-type phototubes possess the additional advantage that operation may be conducted at relatively low light intensity levels without encountering stray electrical current and other like troubles in the detection circuit, and without causing uncontrolled dissociation or photochemical reaction of the sample material in the absorption cell.

Figure 3:
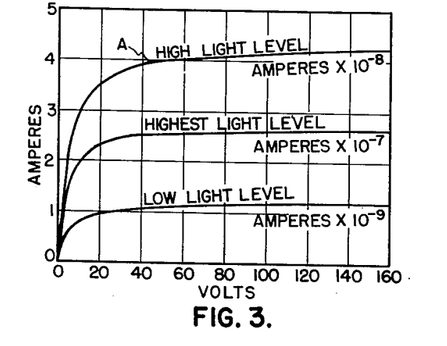
Figure 3 is a plot of the variation of vacuum phototube current with voltage at three different light levels for a typical RCA–935 vacuum type phototube.

Vacuum-type phototubes pass electrical currents which are directly proportional to the light radiation incident upon their light-sensitive cathode elements. Since the internal resistances of vacuum-type phototubes are high, only relatively minute currents, measured in microamperes, will be passed by these devices, and the resulting voltage-current characteristic curves are usually not the same for any two phototubes due to slight inherent differences in individual construction. Figure 3, for example, illustrates the voltage-direct current characteristic curves for a typical RCA–935 phototube at three different light levels, generally described as "low," "high," and "highest," indicating graphically the nature of the relationship during operation. Also in Figure 3, it will be noted that, for all of the light levels represented, relatively small direct current potentials cause the flow of relatively large currents until the potential increases to a level indicated approximately by point A on the topmost curve, whereupon the slope of the voltage-current curve flattens so that only relatively large further increases in potential cause appreciable increases in phototube current. When this condition is reached, the phototube is said to be "saturated." It will be apparent from Figure 3 that the saturation level of any specific phototube will be different for different levels of light intensity. However, investigation has revealed that the percent slope (i. e. the ratio of the slope to the respective ordinate values of each of the plots) is substantially the same within the saturated portions of all of the curves. To compress the three voltage-current curves within a small space it will be noted that different scale multiplying factors have been employed for each of the three light intensity levels so that, if all curves were plotted to the same scale, the "high light level" curve would be located a great deal higher above the "low light level" curve than indicated, while the "highest light level" curve would be located appreciably higher on the ordinate scale than the "high light level" curve.

From the foregoing it will be seen that by means of a simple photometric analyzer, utilizing a suitable light source emitting a single beam of light through a transparent cell and thence to a single phototube connected in series with a conventional milliammeter, the values of the meter readings before and after the sample is interposed in the test beam may be determined and may be substituted in the Beer's law equation; and, with the values of K and d known, the value of the concentration c may readily be calculated. However, such a device has a number of serious disadvantages which result in errors in determination, such as changes in the light source intensity and the phototube's detection efficiency with continued use, changes in transparency of the sample cell due to the gradual deposition of light absorbing impurities on the windows as the sample is continuously circulated therethrough, gradual clouding of the light transmitting elements due to dust accumulation thereon, and lack of sensitivity due to the difficulty of obtaining an accurate measurement of the minute currents which the phototube passes.

It is an object of this invention to provide an improved photometric analyzer which does not possess the hereinabove described disadvantages and which, at the same time, is sufficiently rugged in construction to assure its performance under ordinary manufacturing plant conditions.

In general, this is attained by providing a single light source which emits light from the same identical area to two separate detecting vacuum phototubes connected in an electrical bridge circuit, the test sample being interposed in the light path of one of the phototubes. Suitable devices are provided in the bridge circuit and in both of the light paths to regulate the responses of each of the phototubes so that a compensated base point is practically constantly provided to permit correct determination of light absorption when operation is according to either the electrical rebalancing principle or the complete optical balancing principle, all as will be hereinafter described in greater detail.

Figure 7:
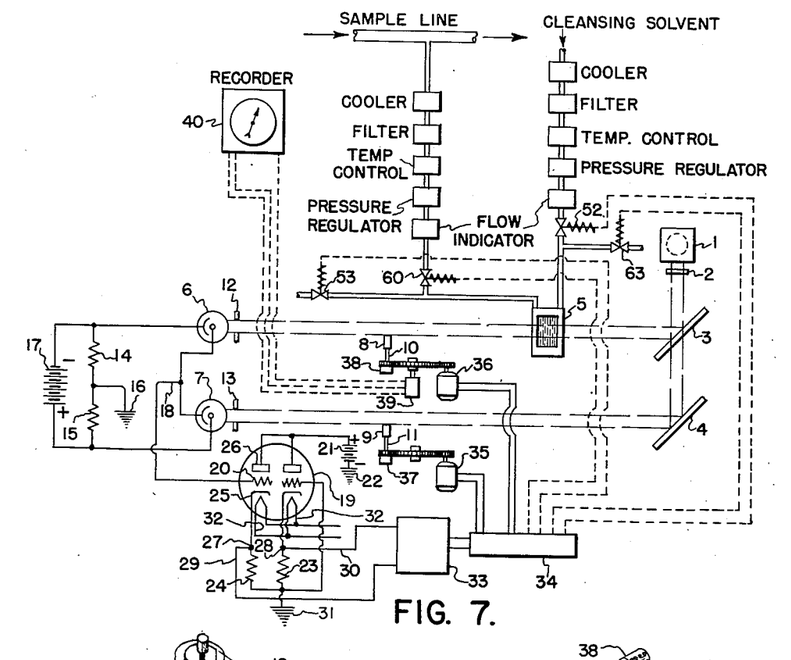
Figure 7 is a diagrammatic representation of a photometric analyzer constructed according to this invention, showing the general optical arrangement of the measuring and standardizing elements, the electrical bridge circuit for relaying the detection of light absorption by the phototubes to associated equipment which effects optical balance, and the sample cell supply and purging equipment.

Referring to Figure 7, the light source 1 should preferably have a long service life and should also be capable of maintaining a fairly steady light output upon long continued use. It is advantageous if source 1 emits light in a discrete band of a particular wave-length which the sample material strongly absorbs. When a source is employed that radiates light of several wave-lengths, optical filter 2 screens out undesired radiation of wave-lengths which are not strongly absorbed by the sample and passes essentially monochromatic light to the sample and standardization paths hereinafter described.

The choice of a light source depends upon the range of radiation in which operation is to be conducted. For wave-lengths between about 250 m$\mu$ and 280 m$\mu$ low pressure mercury vapor lamps have proved suitable, while for wave-lengths between about 280 m$\mu$ and 330 m$\mu$ the standard medium pressure mercury vapor lamps of the H4 and S4 types are preferred. For wave-lengths above about 330 m$\mu$, standard incandescent tungsten lamps may be used, although with this source the radiation is more continuous in intensity over the entire range. Conventional voltage regulators are preferably employed with the light sources to minimize fluctuations in light intensity with line voltage; however, where relatively stable line voltages are encountered the regulators may be dispensed with. Exceptionally stable operation has been attained with conventional incandescent lamps operated from a 6 volt storage battery.

The light source chosen should be correlated generally with the particular phototubes to be used in conjunction therewith. If the phototubes have a high sensitivity, a light source of relatively low intensity may be used, whereas phototubes of low sensitivity require a light source of high intensity. The optimum light level with the phototubes used in this analyzer is such that phototube currents of approximately $10^{-8}$ to $10^{-9}$ ampere are passed, at which level it has been found that the phototube bridge balance point will not shift appreciably even if the light intensity varies within relatively wide limits.

From optical filter 2 the light passes to semi-transparent mirror 3 which divides the radiation so that a portion, preferably approximately half of the total amount not absorbed, is reflected to the sample path, while the remainder passes to opaque mirror 4 where it is reflected to the standardization path. It will be understood that the mirrors and other optical elements of the analyzer must be fabricated from materials which transmit light of the wave-length which is desired for the analysis. In addition, these elements must be approximately neutral to the incident radiation, in that they must transmit light of substantially the same quality as they receive. It has been determined that clear, colorless plate glass, free of a greenish cast, will transmit radiation of wave-lengths in excess of about 320 m$\mu$ satisfactorily, and that Vycor (Corning filter glass No. 791) will transmit radiation below the 320 m$\mu$ level. Mirror 3 is preferably coated with a durable material such as "Duolux" (manufactured by the Evaporated Metal Films Corp., Ithaca, N. Y.), while the opaque mirror 4 may be coated with metallic rhodium, which has been found to possess qualities of toughness approaching those of glass.

Light source 1 is enclosed within a light-tight jacket provided with a suitable aperture aligned in the direction of mirrors 3 and 4, so that the same identical area of the source is drawn upon for the radiation which is diverted to both the sample and standardization paths. This arrangement insures identical illumination for both of the analyzer's optical paths, regardless of variations in light emission due to arc or filament irregularities or other causes which may develop upon long continued lamp use.

As shown in Figure 7 the reflected light from mirror 3 passes through the transparent windows of sample cell 5, which will be hereinafter described in greater detail, and impinges upon the photosensitive cathode area of phototube 6, hereinafter called the balancing phototube, while the reflected light from mirror 4 is impressed upon the cathode area of phototube 7, hereinafter called the standardizing phototube.

In one embodiment of this invention a condition of complete optical balance is maintained between the radiation in the sample path and the radiation in the standardization path, the responses of the phototubes being exactly equal at the balance point. In the second embodiment of this invention the phototube bridge is brought to exact electrical balance at the point where an indication of sample concentration is procured, without bringing the sample and standarization light beams into balance.

The first embodiment, utilizing complete optical balance, will first be described with particular reference to Figure 7.

In this embodiment, the primary purpose is always to maintain equality in the intensities of the light beams impinging on the photosensitive cathode surfaces of both of the phototubes 6 and 7, while at the same time correcting for gradual deviation from the original indication base point and for gradual usurpation of the range of indication by periodic purging and restandardization.

This is accomplished by the use of mechanical light gates 8 and 9 which are mounted on threaded lead screws 10 and 11, respectively, in such a manner that the light gates may be made to traverse the light beams in a direction normal to their axes and thereby regulate the amount of radiation passed on to the phototube cathode surfaces.

Phototubes 6 and 7 are also preferably provided with adjustable shutters 12 and 13, respectively, mounted in such a position that they may be superimposed over both of the longitudinal edges of the more sensitive phototube so that the phototube responses are exactly equal when they are connected in the electrical bridge circuit and the sample cell 5 is filled with a suitable standardization medium. Since mechanical vibrations may result in edge deflections which alter the absolute cathode area exposed, it will be understood that it is preferred to mask both edges of the more sensitive phototube to achieve initial light balance, rather than merely masking a single edge to a proportionately greater degree. Ordinarily, the standardizing phototube 7 will be masked by a shutter while phototube 6 will be entirely unmasked. It may be convenient also to provide a shutter for each of the light paths to permit ready adjustment of the individual phototubes as conditions may require, such as occassional phototube replacement.

Phototubes 6 and 7 are connected in series-aiding relationship in a modified Wheatstone bridge circuit comprising resistance arms 14 and 15, ground connection 16, and a source of substantially constant direct current potential, indicated generally at 17. A tap 18, connected between the two phototubes, leads to the grid 20 of an electrometer tube 19 which translates the bridge signal to a corresponding signal at a higher power level for accomplishing optical balance in a manner which will be hereinafter more fully described.

The described electrical bridge circuit is characterized by a very high degree of inherent sensitivity which is utilized to advantage in this embodiment of the invention by operating the two phototubes in null-balancing relationship within the saturated portions of their respective voltage-current curves, and, at the same time, confining operation to substantially the same portions of these curves at all times. The principles upon which the electrical bridge circuit functions will be explained with particular reference to Figures 4, 5 and 6.

Figure 4:
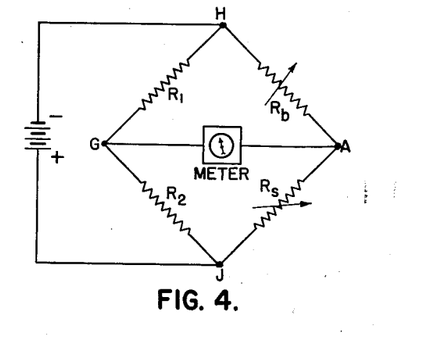
Figure 4 is a diagrammatic representation of a Wheatstone bridge circuit containing pairs of fixed and variable resistors leading from each of the points of impressed potential with a meter connected across the common resistor terminal points.

Referring to Figure 4, it will be seen that the diagrammatic Wheatstone bridge circuit there shown is electrically equivalent to the bridge circuit of Figure 7, except that variable resistors $R_b$ and $R_s$ have been substituted for phototubes 6 and 7, which vary in resistance with the light incident thereon, and an electrical meter having a high resistance as compared to $R_b$ and $R_s$ has been substituted for electrometer tube 19.

Bridge balance for the circuit of Figure 4 is attained when the potential difference from H to A equals the difference from H to G, and that from A to J equals that from G to J, under which conditions there will be no potential difference from A to G and the meter will read zero. Since the potential drops in the respective arms of the bridge are proportional to the individual resistances of the arms, the following relationship exists:

$$\frac{R_b}{R_1} = \frac{R_s}{R_2} \quad \text{or} \quad \frac{R_b}{R_s} = \frac{R_1}{R_2}$$

Thus, it will be apparent that, when $R_1$ and $R_2$ are equal, electrical balance, as indicated by a zero reading on the meter, will be obtained when $R_b = R_s$. In this discussion it will be assumed that resistances $R_1$ and $R_2$ (equivalent to 14 and 15 of Fig. 7) are of equal value.

Figure 5:
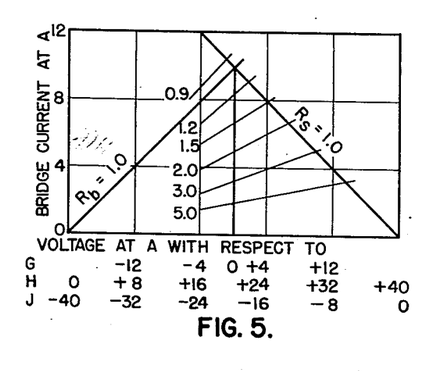
Figure 5 is a graphical representation of the potential and bridge current relationships when one of the variable resistors of Figure 4 is adjusted while the other variable resistor is maintained constant.

If the meter of Figure 4 has a high inherent resistance, as is the case with electrometer tube 19, practically zero current will be drawn through the meter, and the same current will pass through both $R_b$ and $R_s$, whereupon the potential drops across each will be in direct proportion to their resistance values, regardless of whether the bridge is balanced or unbalanced. Since the current passing through both $R_b$ and $R_s$ will depend upon the values of both of the respective resistances when the voltage impressed across the bridge is maintained constant, a graphical representation of the potential differences between the various points of the bridge may be presented, as illustrated in Figure 5, to represent the relationship of potential difference and bridge current with variations in the value of one of the variable resistances, the other being held constant. If $R_s$ is held constant at a value of 1.0 and $R_b$ is also 1.0, the bridge will be in balance, and the potential difference from point A to G, indicated by the intersection of the two voltage-current plots, will be zero. Similarly, as $R_b$ varies from 0.9 to a value of 5.0, the intersection of the $R_b$ line with the $R_s$ line is accompanied by the corresponding variation in potential difference and bridge current indicated on the abscissa and ordinate scales. It will be noted that, as the degree of unbalance between $R_s$ and $R_b$ increases, a progressively higher unbalance voltage exists between point A and point G, or, in relation to the circuit of Figure 7, between tap 18 and ground 16.

Figure 6:
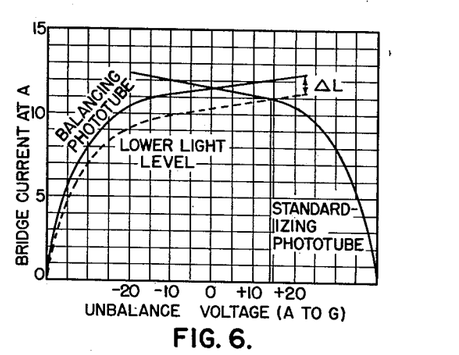
Figure 6 is a graphical representation of unbalance voltage and bridge current relationships for two vacuum type phototubes connected in electrical bridge type circuit, showing the effect of variations in incident light intensity.

As previously shown in Figure 3, the voltage-current variation with resistance is not linear over the whole range for vacuum phototubes; however, a substantially linear relationship exists in the saturated region; therefore the voltage-current plots for phototubes can be represented as in Figure 6, which embodies the same relationship developed in Figure 5 specifically applied to the condition where phototubes are substituted for the variable resistors $R_b$ and $R_s$. When the balancing phototube's resistance is equal to the standardizing phototube's resistance, the unbalance voltage from A to G will be zero. If the light intensity impressed on the balancing phototube is reduced by an amount $\Delta L$, and the balancing phototube's resistance increases proportionately, the voltage-current curve is displaced downwardly as indicated by the broken line curve. A relatively high unbalance voltage of approximately 14 volts, determined from the new point of intersection of the curves, will then exist between points A and G (or between tap 18 and ground connection 16 of Fig. 7). It will be understood that a relatively small change in light intensity is accompanied by a large change in unbalance voltage, making the described bridge circuit a highly sensitive device for the measurement of differences in light quantity.

The electrometer tube 19 of Figure 7 is preferably of the double triode type shown, enclosed within a common envelope to insure that changes in gas pressure and ambient temperature will affect each section alike and thus obviate diversities in operation caused by environmental differences. Since the current level in the phototube bridge is maintained at approximately $10^{-8}$ to $10^{-9}$ amperes, the electrometer tube must draw currents of much smaller magnitude, so as not to affect bridge operation and, in addition, the electrometer tube should be stable over long periods of use and relatively insensitive to voltage fluctuations in its power supply. A type 6F8G dual triode amplifier tube has been found to be a satisfactory electrometer tube for most applications of this invention.

As shown, both triode sections are supplied from a common voltage source 21 and both cathode elements are grounded at 31 through their respective resistors 23 and 24, so that the potential between points 27 and 28 will be zero as long the electrical potential of grid 20 remains at zero level. The two cathode elements of electrometer tube 19 are heated by resistance elements 32 in parallel connection, which are supplied with current from a common outside source not shown. When one of the phototubes, for example 6, receives less light than phototube 7, a more positive potential relative to ground is impressed upon both point 18 and grid 20, the grid current remaining almost zero in magnitude. Under these conditions a large electron current passes between cathode 25 and plate 26, and the potential of point 27 approaches that of plate 26; that is, it is highly positive with respect to point 28. Conversely, when phototube 6 receives more light than formerly, the grid potential changes to negative and the flow of electron current decreases proportionately, whereupon the potential at point 27 approaches that of ground and becomes negative relative to its former condition, at the same time becoming negative to point 28. In this connection, the right-hand triode section always provides a reference for comparison with the left-hand triode section, any potential difference across leads 29 and 30 being, for all practical purposes, solely the result of changes in potential at tap 18 of the phototube circuit, regardless of the absolute potential level which may exist in the electrometer circuit due to slight changes in terminal voltage of source 21 upon prolonged use, or from other causes. The double triode electrometer tube 19 performs its function of transforming the relatively weak input from the phototube circuit to an output at a higher power level without interfering with the functioning of the phototube circuit.

The signal from the electrometer circuit impressed on leads 29 and 30 is passed to conventional auxiliary equipment, indicated generally at 33, to effect the restoration of optical balance by manipulation of the light gates 8 and 9. Device 33 receives the direct current signal voltage from leads 29 and 30, converts this signal to alternating voltage of a phase relative to the alternating line voltage which is determined by the polarity of the input voltage, amplifies the resultant voltage and supplies this voltage to the repeat cycle timer 34, where it is switched to one or the other of the light gate motors 35 and 36 in a preselected sequence determined by the time setting of 34.

Motors 35 and 36 are of the brushless, reversible, variable speed, two phase induction type, one winding of which is continuously energized through phase-shifting capacitors 77 and 78 (refer Fig. 9) by ordinary 110 volt alternating current line voltage while the other winding is responsive to the signal voltage received from 33, so that rotation will be in one direction upon the reception of voltage of a phase corresponding to one polarity of signal from leads 29 and 30 and in the opposite direction upon the reception of voltage of a different phase corresponding to the opposite polarity. The light gate motors drive light gate lead screws 10 and 11 through idler gears which reduce the speeds at which the screws impel the light gates across the light paths and permit the accurate indication of the degree of light gate travel from the zero travel point by the revolution counters 37 and 38 directly connected to the lead screws.

A continuous record of sample compositions is secured by mounting the movable center tap of a conventional helical type resistance, indicated generally at 39, upon the shaft of the idler gear of motor 36, and connecting the leads of this divided resistance in circuit with a conventional automatic null-balancing electrical bridge type recorder 40. With this arrangement the two divided portions of helical resistance 39 will function as two arms of a Wheatstone bridge circuit, the other two arms of which are an integral part of the recording device circuit. One of the resistance arms of the recorder is provided with a movable tap, the position of which is continuously altered to correspond with the position taken by the center tap of helical resistance 39, the Wheatstone bridge circuit of which these elements are part being continuously balanced by null-balancing electrical means which are an integral part of the recorder mechanism. The electric motor which restores electrical balance in the Wheatstone bridge circuit described actuates the recorder pen, the position of which varies in accordance with the position of the center tap of helical resistance 39, thereby tracing a record of sample compositions. The indication of the recording device is interpreted in terms of sample composition by calibration in a manner hereinafter described.

The purging and sampling circuits shown in Figure 7 are illustrated in the preferred arrangement employed when a liquid sample is being analyzed. When a gaseous or vaporous sample is analyzed, a gaseous purge is substituted for the cleansing solvent with similar equipment being utilized in both instances.

The sampling circuit of Figure 7 employs the several conventional sample conditioning devices shown to filter out foreign solid materials which tend to settle on the windows of sample cell 5 and to regulate the temperature and pressure at which the sample stream is introduced into the cell. Sample material is usually supplied to the analyzer cell at substantially constant temperatures ranging from about 20° C. to 70° C. and substantially constant pressures in the range of about 0 to 300 lb./sq. in. gage. It is also desirable to maintain a fairly constant flow rate, preferably about 500 cc./minute, and the flow indicator installed in the sampling line provides a convenient check of the valve setting. The cleansing solvent or gas purge lines are similarly equipped so that the temperature of the sample cell will not be altered during purging operations and errors in sample analysis thereby introduced when testing operations are resumed.

The sampling, purging and drain lines are each fitted with solenoid valves responsive to the cycle timer housed in the repeat cycle timer box 34, so that successive operations are automatically carried out in a preselected sequence.

In operation, the mechanical reference base point is the scale zero of revolution counter 38 of the sample light gate 8. Before analysis is started light gate 8 will be disposed across the sample light path to its fullest extent when revolution counter 38 reads zero, so that a minimum of light will then impinge upon phototube 6. The standardizing light gate 9 will be withdrawn from the standardizing light path to almost the fullest extent, permitting a near maximum of light to pass to phototube 7, whereupon revolution counter 37 will register a reading of from about three-fourths full scale to full scale. With sample cell 5 filled with a suitable standardizing material, light shutters 12 or 13 are adjusted to match the phototube sensitivities one against the other and, at the same time, preserve the respective counter readings of zero on light gate 8 and near full scale on light gate 9.

The testing cycle may now be initiated by closing the power switch activating repeat cycle timer 34, which in turn actuates its internal cycle timer mechanism to open the solenid valve in the sample supply circuit and introduce conditioned sample to cell 5. As the fluid sample continuously circulates through cell 5 across the path of the testing light beam a finite amount of light will be absorbed in direct proportion to the concentration of the material being analyzed for and phototube 6 will receive less light than it did when in original balance with phototube 7. The resulting optical unbalance will then be converted to electrical unbalance by the phototube bridge circuit and the resulting signal will be amplified and translated to a phase which, when impressed on the secondary winding of light gate motor 36, through the intermediate agency of amplifier 33 and repeat cycle timer 34, will cause this motor to rotate in a direction which will restore the optical balance, i. e., light gate 8 will be withdrawn from the sample light path to such a degree that the light passing to phototube 6 will be made equal to that passing to phototube 7. During the analysis period light gate motor 36 will be solely responsive to changes in optical balance as reflected in the functioning of the electrical bridge, the electrical circuit to motor 35 being retained open by a switch in the cycle timer mechanism 34.

In the course of analyses, interfering substances may deposit on the windows of sample cell 5, or the characteristics of the several elements of the mechanism may gradually deviate from their original states due to aging effects, so that errors may be introduced as a result of usurpation of the lower end of the analytical range, or from other effects. It is therefore desirable to periodically purge deposits from the sample cell and restandardize one phototube against another so that diversities in individual element functioning may be compensated for and accuracy of analyses maintained.

This function is accomplished by the internal cycle timer mechanism 34 which, at preselected regular intervals opens the circuits to the sample supply solenoid value and sample light gate motor 36, closes the circuits to the solenoid valves in the cleansing solvent and drain lines to accomplish purging in a desired sequence, and finally restores the mechanism to a condition where sample cell 5 is filled with standardizing material, sample light gate 8 is returned to zero position on its counter scale and standardizing light gate motor 35 is connected in circuit with the electrical bridge. If any residual light absorbing material has survived the purging of sample cell 5, or if any of the various elements of the analyzer have deviated from their original states due to aging, incident to protracted use, the electrical bridge may no longer be in balance, and a signal impulse may then be relayed through amplifier 33 and repeat cycle timer 34 to activate motor 35. Motor 35 will thereupon move light gate 9 into or out of the path of the standardizing light beam a suitable amount to alter the light influx to phototube 7 and simultaneously restore complete optical balance to the system. When standardization and rebalancing have thus been accomplished, repeat cycle timer 34 initiates a repetition of the complete testing cycle by closing the electrical contacts which place motor 36 in circuit with the phototube bridge, opening the contacts in the circuit connecting motor 35 with the bridge, and opening the solenoid valve in the sample supply line to permit the resumption of flow to cell 5.

Figure 9:
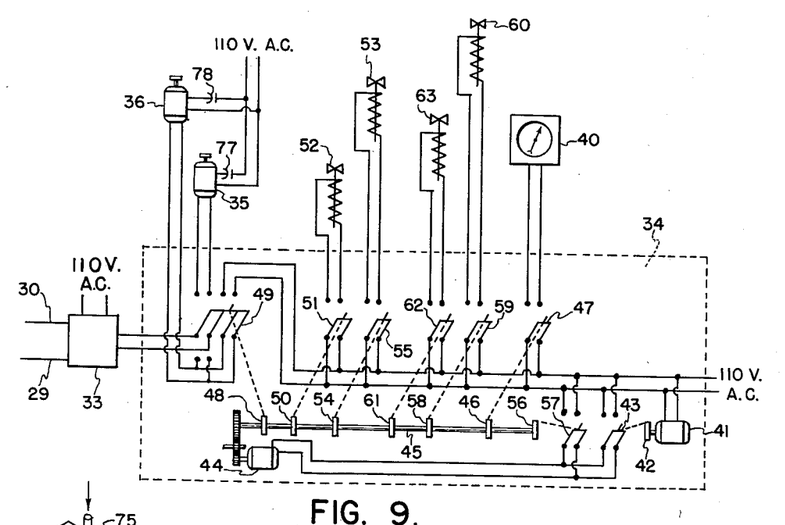
Figure 9 is a schematic representation of the timing circuit utilized in conjunction with this invention.

Referring to Figure 9, the foregoing sequence of operations is effected by the repeat cycle timer 34 which incorporates the repeat cycle timer motor 41, the shaft of which is provided with the minor cycle initiating cam 42. Cam 42 is adapted to close the minor cycle initiating springloaded switch 43, as indicated by the broken line connecting these elements, and is adjustable so that the cam can be made to accomplish this function at any predetermined interval of time, preferably once per hour or greater number of hours, as desired.

The closing of switch 43 actuates minor cycle timer motor 44 which drives the minor cycle timing cam shaft 45 and thereby closes the several minor cycle springloaded switches which actuate the motors, solenoid valves and recorder motor in orderly sequence. Since commercial timing motors, such as 41, are ordinarily effective only for tthe control of relatively short time cycles, it is usually advantageous to initiate the cycle by motor 41 and thereafter control its duration by a suitable cam, such as 56, which retains normally open, spring-loaded switch 57 closed during the full duration of the cycle. Accordingly, the cycle period will be independent of the action of motor 41 and cam 42 once the cycle is initiated. Motor 44 drives shaft 45 through a gear train, the individual elements of which may be changed to secure a wide range of gear ratios and varying over-all minor cycle periods. The minor cycle cams 46, 48, 50, 54, 56, 58 and 61 are preferably two-part adjustable types, permitting individual selection of each camming period to suit particular requirements.

As indicated by the broken lines connecting the individual minor cycle cams with the several power switches, cam 46 operates normally closed recorder motor switch 47 so that when switch 47 is open, the potentiometer balancing motor, which is responsive to helical resistance 39, is inactivated, and recorder 40 is locked at the precise reading which it registers at the moment the minor cycle commences. This operation, and succeeding minor cycle operations, occurs in the sequence shown in Figure 10, wherein the wavy lines define the duration of the individual steps for a typical minor cycle ranging from 0.5 minute to 2.5 minutes over-all.

Figure 10:
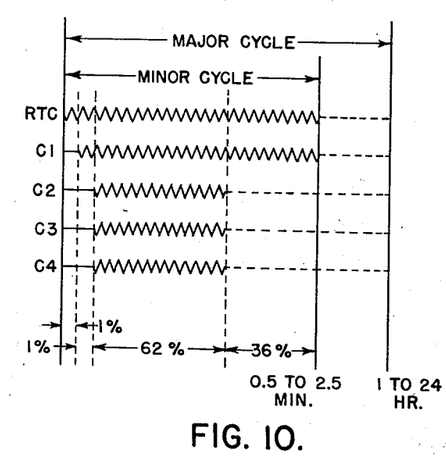
Figure 10 is a graphical representation of the sequence of successive operations during the timing cycle.

In Figure 10 line RTC represents the repeat cycle timer action initiated by cam 42 and switch 43 and sustained to the end of the minor cycle by cam 56 and switch 57. After a time interval of 1% of the minor cycle period cam 46 opens switch 47, locking recorder 40 for the balance of the minor cycle period as indicated by line $C_1$. After an interval of 2% of the minor cycle period, as indicated by line $C_2$ of Figure 10, cam 58 opens normally closed switch 59, inactivating sample supply solenoid valve 60 and discontinuing the supply of sample to cell 5.

At the same time that operation $C_2$ commences, cam 48 throws double switch 49 to its upper position, as indicated by line $C_3$, taking motor 36 out of circuit with amplifier 33, and simultaneously placing motor 35 in circuit with 33 and the secondary winding of 36 in circuit with the alternating current supply line. Motor 36 thereupon drives balancing light gate 8 to zero reading of counter 38, where it remains in proper position for the standardization operation. At the same time motor 35 receives signal impulses from amplifier 33 which cause it to move standardizing light gate 9 to such a position that light balance between the sample and standardizing paths will be maintained during this period. It will be understood that the actuation of motor 35 at this particular instant is somewhat premature, since it occurs during the purging step before cell 5 may be thoroughly scoured and in condition for standardizing. It is desirable, however, to impress power on the standardizing motor for a somewhat more lengthy period than is actually required for the standardization-rebalancing operation per se in order that the inertia of its elements resulting from long inactivity will be overcome by the additional movement.

Concurrently with operation C3, cam 50 closes switch 51, cam 54 closes switch 55 and cam 61 allows normally closed switch 62 to open, all as indicated by C4, Figure 10, which operation respectively opens purge liquid supply solenoid valve 52, opens purge liquid evacuation solenoid valve 53 and closes sample evacuation solenoid valve 63. It will be noted that the purge liquid passes through cell 5 in a counter-current direction to that taken by the sample during the analytical period, which facilitates cleansing of both the cell and the piping system. A separate purge liquid drain is provided as shown to avoid extensive contamination of the sample material which may be returned to the process system through a separate drain line, not shown, connected to the outlet side of valve 63. If complete freedom from contamination is desirable it will be obvious that the initial sample material contacting the purge liquid remaining in the cell after standardization may be routed through the purge liquid evacuation line by a separate by-pass line controlled by an independent cam-switch-solenoid valve set similar to those already described, or in other conventional ways.

The flow of purge liquid through sample cell 5 continues for 62% of the minor cycle period, as indicated by line C4, during which time a stable position is taken by light gate 9 corresponding to a state of optical balance between the two light paths. At the conclusion of the standardizing-rebalancing operation, after cams 50 and 54 have discontinued the through flow of purge material and cam 61 has permitted sample evacuation valve 63 to open, cam 48 throws switch 49 to its lower position, placing motor 36 again in circuit with amplifier 33 and cam 58 opens sample supply valve 60 to resume the flow of sample material through cell 5. As indicated by C1, the recorder is retained in locked condition for a short additional period to enable motor 36 to return light gate 8 to approximately the same position which it occupied before the commencement of the minor cycle, after which cam 46 returns the recorder motor to operation by closing switch 47. The minor cycle represented by RTC is thereafter concluded by the additional movement required to return cam shaft 45 to exactly the same position which it occupied at the beginning of the minor cycle period, when further action is terminated by the opening of switch 57 by cam 56. A repetition of the minor cycle is not again effected until motor 41 tolls out another full operating period.

Figure 8:
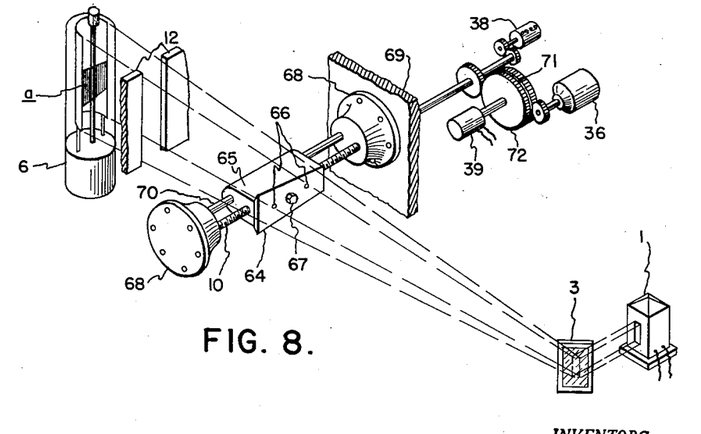
Figure 8 is a detailed perspective view of one embodiment of sample light gate which may be used with this invention showing its disposition with respect to the various optical elements located in the light path, the sample cell being omitted for purposes of simplicity in representation.

The detailed construction of one embodiment of sample light gate is shown in Figure 8, it being understood that the standardization light gate 9 may be similar in all respects, except that the latter does not embody a helical resistance element 39.

In Figure 8, the light regulating element proper comprises metal plate 64 which is fixedly supported on carriage 65 by pins 66 and bolt 67. Carriage 65 is threadedly mounted upon lead screw 10 which is journaled in bearing member 68 bolted to suitable supporting brackets, such as 69, mounted within the analyzer case, so that rotation of screw 10 will move carriage 65 from one position to another while it is interposed across the full light path. Carriage 65 is slidably fitted to non-rotatable guide bars 70, also supported by bearing members 68, so that carriage 65 is restrained from rotation around lead screw 10 in the course of its movement.

Regulating plate 64 is wider than carriage 65 and its associated lead screw 10 and guide bar 70, whereupon light reflected from mirror 3 through a sample cell (not shown) will be interrupted by plate 64 which will cast its shadow across the photosensitive cathode element and the anode element of phototube 6, as indicated generally by area $a$. As shown in Figure 8, adjustable light shutter 12 is here set so that all light reflected from mirror 3 impinges on the cathode of phototube 6; however, the two shutter leaves may be moved to a position where they overshadow the longitudinal edges of the cathode element if such an adjustment is required, as previously described, to obtain an initial sensitivity balance between the two phototubes. The uncovered area of the cathode constitutes the portion responsive to the variations in light intensity accompanying sample absorption. It will be understood that regulating plate 64 is always interposed across the cathode area of its associated phototube for any position taken during its full range of travel, so that it will always mask carriage 65, lead screw 10 and guide bar 70.

The light gates are preferably provided with conventional friction-type slip clutches, which may conveniently take the form of leather discs 71 interposed between the two elements of the double idler gear 72, to prevent jamming or overstraining of the lead screws when the carriages are impelled to the full ends of their travel in either direction.

Light gate regulation with this embodiment of light gate is attained by gently tapering the longitudinal edges of plates 64 so that the plates have the general shape of a trapezoid. The bases of the trapezoids are preferably disposed at the outer ends of the carriages, away from the drive motors, so that movement of the carriages outwardly, in a direction increasing the light impinging on the phototubes, is accompanied by increased readings of the revolution counters. The light dividing edges of plates 64 are beveled to a thin edge so that small eccentricity in guide bar 70 and screw 10 will not cause changes in the projected area of 64 upon the cathodes of the phototubes. In this connection, plates constructed with a ratio of edge thickness to mean width of about $0.004/0.625=0.006$ have effectively prevented analytical errors from eccentricity when machining techniques of nominal precision have been employed in the fabrication of the lead screws and guide bars. The trailing edge of carriage 65 may be drawn to a smaller thickness than the forward edge to avoid any interference with light passage from this source.

The inclination of the edges of regulating plates such as 64 and their mean widths will depend upon the degree of light interruption which is desired for the full range of travel of the regulating plates across the light paths. In a typical installation where the plate was 2.000" long and was centered in the light path for a mid-scale absorption indication, and where a light absorption compensation of only 6% was required with a full scale carriage movement of 1.000", the narrow end of the regulating plate measured 0.597", while the wide end measured 0.657". In another case, where a 16% light interruption was required with full scale carriage travel of 1.000", the narrow end of the regulating plate measured 0.545" while the wide end measured 0.716", the total length of the plate being 2.000". Other correlations of regulating plate dimensions with carriage travel may be made to best suit particular operating conditions, the criterion being that full scale movement of the plate must be sufficient to increase the light input to the balancing phototube by at least the maximum amount which is absorbed by the sample material in the course of analysis. The slope of the standardizing regulating plate edges will depend upon the gross amount of tolerable interference arising between successive sample cell replacements and the sensitivity of adjustment which is required to effect a balance between the standardizing light beam and the sample light beam. In most cases a considerably greater edge inclination is permissible in the case of the standardizing light regulating plate. For the hereinabove described sample light regulating plate of 16% variation over full scale, the corresponding dimensions of the standardizing light regulating plate were 0.392" for the narrow end and 0.890" for the wide end, both dimensions being referred to a range of plate movement measuring 1.000", and a plate length of 2.000".

The light gate construction described has a number of important inherent advantages. In the first place, the movement of a trapezoidal light regulating plate bears an essentially linear relationship to the concentration of the material in the sample cell, where maximum absorption is small (below about 30%) or, in the case of the standardizing plate, to the amounts of the interfering deposits, whereupon the various compositions may be ascertained by direct reading of the associated revolution counters, or by devices directly responsive to lead screw rotation, without necessitating the use of complex cam or other like translational devices to convert the indication to readily usable terms. Also, the trapezoidal shape of the light regulating plate exercises some compensation for the effects of varying cathode sensitivity by uncovering two remote strips of the cathode area simultaneously. This compensation is especially important in the lower end of the analytical range wherein the light absorption is of the order of only 5% or somewhat greater. The trapezoidal light gate is preferred because of its simplicity in mounting and fabrication. Other types of light regulators, however, may be substituted, including cut out plates wherein the light admitting inner profile is trapezoidal in shape, cylindrical slugs, or devices which operate to regulate the intensity over substantially the entire cathode area, such as relatively fine mesh wire screens, rotatable glass plates, polarizing screens or like devices. Each of these light regulators possesses specific advantages over the others, the cut out trapezoid being particularly effective in compensating for varying cathode sensitivity, since it continually masks out the more non-uniform photosensitive surfaces at the top and bottom of the cathode elements, and in addition is effective to pass more analytical light than light-impervious regulating gates. However, considerations of simplicity in mounting and fabrication favor the use of light-impervious trapezoidal regulators of the type hereinbefore described in detail for most uses.

Mechanical light gates have proved satisfactory for the accurate measurement of light variations in the range of 5% absorption for full scale deflection and up. However, mechanical optical rebalancing is difficult to accomplish at levels below 5%, due to the proportionally greater inaccuracies occasioned by the unavoidable slight lead screw eccentricities, permitting slight tipping and tilting of the light regulating plates and similar effects. Therefore, for analysis below the 5% absorption level it is preferred to employ the electrical rebalancing embodiment of this invention which operates to restore balance to the electrical bridge according to the principle illustrated in Figure 11. In both embodiments of this invention an electrical bridge is utilized to secure the differential measurement of light quantities in the two light paths and in both the ratio $R_b/R_1$ (refer Fig. 4) is maintained equal to the ratio $R_s/R_2$.

Figure 11:
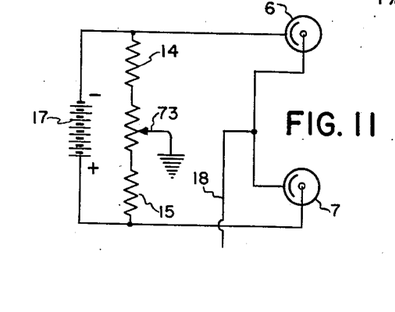
Figure 11 is a diagrammatic representation of a phototube bridge circuit modified to permit electrical rebalancing of the phototubes according to this invention.

Referring to Figure 11, wherein all elements performing the same functions as those shown in Figure 7 are designated by similar reference characters, it will be seen that the essential change in the electrical bridge circuit necessitated by electrical rebalancing comprises placing an additional adjustable resistance 73 between the fixed resistances 14 and 15. With this arrangement the potential at the center of the phototubes impressed on the grid of electrometer tube 19 through lead 18 is translated to a signal impulse by amplifier 33 which is utilized to vary the position of the tap of 73 to restore electrical balance to the bridge. The modification of the equipment shown in Figure 7 required for electrical rebalance is the substitution of a divided helical resistance of the same type as 39 for light gate 8, the new helical resistance being positioned outside of the sample light path with its two adjustable branches connected in series between fixed resistances 14 and 15 and its movable tap grounded. Motor 36, in responding to the signal received from amplifier 33 and timer 34, thus varies the position of the center tap of the new helical resistance in such a manner that the effective resistances of the two resistance arms will always bear the same ratio to their associated phototube resistances as the latter characteristics vary with light influx. It will be understood that the arrangement of equipment employed for optical rebalancing shown in Figure 7 is not otherwise altered, so that standardization will still be periodically effected by light gate 9, and a continuous recording of composition values will be secured through helical resistance 39 in circuit with recorder 40.

Utilizing electrical rebalancing the zero point at which bridge balance is achieved will vary over substantial lengths of the phototube characteristic curves shown in Figure 6. It has been found, however, that this is not detrimental when the bridge supply voltage is well regulated because the shapes of the curves remain remarkably stable over relatively long periods, particularly when operations are conducted at relatively low light levels. Errors in determination from stray light effects are minimized with electrical rebalancing, because the balancing operations per se are not accompanied by corresponding variations in stray light influx to the phototubes. An additional advantage of electrical rebalancing resides in the analytical range adjustment provided by the variable resistance 73. If resistances 14 and 15 are completely eliminated from the circuit, the resistances of the two bridge arms will be completely variable and the circuit will then have maximum range capacity. However, it is usually desirable to retain fixed series resistances 14 and 15 on either side of the resistance varied by 73 so that balancing operations will always be restricted to the linear portions of the phototube characteristic curves. This restriction is not disadvantageous, since relatively long portions of the phototube curves remain available for range regulation within the prescribed limits.

Figure 12:
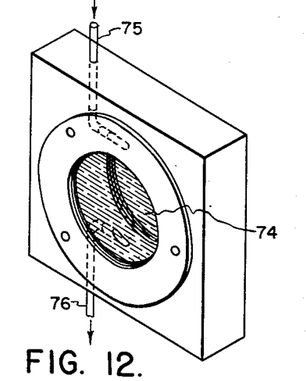
Figure 12 is a perspective view of one embodiment of sample cell which may be used with this invention.

The sample cell shown in Figure 12 is preferred for gas analysis applications of this invention. The cell is essentially a cylindrical chamber of fixed length provided with light transparent entrance and exit windows 74 for the free passage of the analytical light and tangentially disposed inlet and outlet ports 75 and 76, respectively, for the passage of the sample gas stream. For relatively large light absorptions a sample cell ½′ long has proved satisfactory while, for smaller light absorptions, a 5″ cell is preferred. For liquid analyses a sample cell having diametrically opposed straight run inlet and outlet ports possesses the advantage that eddying of the liquid with accompanying bubble entrainment is prevented and light interference effects from this cause avoided.

The choice of a suitable purging-standardizing medium in both the gas and liquid analyzers will depend upon the particular system under investigation as well as on the range of compositions involved. A material which is not corrosive to the sample cell and which possesses good solvent properties for collected deposits is preferred. Also, the purge material should have substantially the same refractive index as the sample material since, otherwise, there will be a difference in the amount of light reflected from the inside surfaces of the sample cell windows which will cause different amounts of light to be passed to the phototubes during the analyzing and standardizing periods of operation. Refractive index difference is particularly important in the case of liquids because the range of variation of this characteristic is greater for liquid materials than for gases.

In two-component systems, where analysis is directed to the determination of one of the components, the other component material may be utilized as the purging medium. Where a third material is used for purging, its refractive index characteristic should approximately match that of the sample material.

It is sometimes possible to analyze for one component with an unusually high degree of precision through the suppression of the analyzer's zero point by a judicious choice of purging material. This procedure is particularly effective where it is desired to maintain the concentration of one component at a predetermined level by conventional associated control equipment responsive to analyzer detection. Thus, if it is desired to control chlorine concentration at 50% ±0.1%, it may be advantageous to standardize the analyzer with a somewhat lower chlorine concentration, for example 45%, so that the zero point will be raised correspondingly. Then, any sample containing more than 45% chlorine will register a net absorption which may be interpreted in terms of concentration by use of either Beer's law or empirical calibration.

The principles underlying the foregoing procedure may also be advantageously applied to inverse range operation. For example, if it is desired to determine the purity of chlorine in concentrations ranging from about 90% to 100%, the remainder comprising non-absorbing contaminants, 100% chlorine may be used as the standardizing medium, it being understood that in this case the travel of the balancing light gate must be reversed so that this gate will assume its maximum absorption position prior to the standardization operation. This may be conveniently accomplished by reversing the phase of the voltage supplied to the secondary winding of the balancing motor during standardization by interchanging the two input leads to the secondary winding without otherwise changing the operation. For the inverse range measurement described, it will be understood that a light wave-length must be utilized such that the difference in absorption between the 90% and 100% chlorine concentrations of the example will lie within the limits of the analyzer's full scale deflection.

The analyzer of this invention is also adapted to the measurement of one component of a two-component mixture wherein the first component absorbs very strongly while the second component is a weak absorber. Under these conditions changes in concentration of the strong absorber produce relatively small changes in the absorption of the weak absorber, which may then be used as a purging medium during standardization, so that the indication will be zero when the light traverses the sample cell during this portion of the cycle.

In all three of the foregoing procedures the inherent absorption of the purge materials is actually compensated and the phototube bridge is rebalanced by adjusting the standardizing shutter 13 or light gate 9, if its range is adequate, to reduce the response of the standardizing phototube 7 by an amount comparable with the response reduction sensed by the balancing phototube 6 due to the presence of the absorbing purge material.

In some of the hereinabove described analyses wherein strong light absorption occurs for all indicator readings, it is sometimes desirable to reduce the light supplied to the standardizing phototube to levels near or below the limits of regulation of the standardizing light shutters and light gates. Rather than approach these limits and thereby utilize only a relatively narrow portion of the phototube surface, it is preferred to interpose a second absorption cell across the standardizing light path filled with material having a composition corresponding to the approximate average composition of sample encountered during the analysis. The employment of such a second absorption cell possesses the additional advantage that, if analysis is conducted with a relatively broad band of radiation, as distinguished from monochromatic light, essentially the same composition of light will be supplied to both of the phototubes.

The analyzer of this invention may also be used for the analysis of two-component mixtures both components of which absorb at the wave-length utilized and neither of which absorbs much more strongly than the other. In this case, however, both may not have identical absorption coefficients. In this system the total absorption of the mixture is generally a single-valued function of the concentration of either of the components. The revolution counters may then be calibrated empirically in terms of the concentration of either or both of the components and, if desired, the useful range of readings may be expanded to occupy the full span of the counters by the choice of a purge material of suitable absorption and by the employment of a light gate possessing a sensitivity range corresponding to the desired counter range. In some cases the degree of absorption is not a single-valued function of the concentration of either of the components but, if the approximate concentrations of the components are known, there will generally be no uncertainty as to which of two possible values is the correct exact concentration.

The analyzer of this invention is applicable under certain conditions to the analysis of a single component in admixture with several other light absorbing materials which are present in sufficient preponderance so that the volumetric difference between the sample containing the analyzed component and the residuum from which the sample has been removed does not introduce errors into the determination. In such a case the sample material is circulated through the sample cell where a characteristic light absorption due to the analyzed component as well as to the other components occurs, after which the material is treated by conventional chemical procedures for the removal of the analyzed component and the residuum circulated through a second compensating cell interposed across the standardizing path. The net indication then secured will be that of the component investigated. Generally, this method of operation is limited to systems where the percentage of the volume of the component being investigated to the total volume does not greatly exceed the percentage error that is tolerable in the concentration measurement. Also, the interfering components should not absorb so strongly that their share of the total absorption aggregates more than about 95% of the total absorption of the system. Many analyses requiring the determination of relatively dilute concentrations meet the foregoing requirements, and the restrictions on concentration and interfering absorptions do not seriously limit the use of a compensating cell in such cases. It will be understood that a compensating cell of the nature described may be utilized for the analysis of systems where the relative proportions of the interfering materials do not change sufficiently to introduce error greater than that which can be tolerated in the analysis of the component under investigation, in which case a mixture of the known average concentrations of the interfering materials may be circulated through the compensating cell without resorting to removal of the component of primary interest and analysis of the residuum.

Analyzers constructed according to this invention are calibrated by the circulation of known concentrations of the materials within the analytical range under investigation through the sample cell, determining the sample counter or recorder readings corresponding to the known compositions of the material being analyzed for, and then plotting the relationship of composition to mechanical indication. It is usually desirable to secure a check of the composition of the calibrating medium after its traverse of the sample cell by conventional chemical analysis to determine whether any change in composition has occurred in the course of such transit. Where dilute calibration mixtures are employed, sufficient adsorption within various elements of the sample circuit may take place to introduce substantial errors in calibration unless conditions are verified by subsequent analysis as described. It is preferred to establish the calibration with three or more known compositions interspersed throughout the whole analytical range of interest, the resulting composition-mechanical indication plot being linear or only slightly non-linear in all cases.

To minimize induced stray current effects during operation, the general principles of electrical engineering should be observed in the construction of the analyzer, in that suitable electrical shielding should be provided for elements requiring such protection, and a short, rigidly supported conductor should be employed for the connection between the phototubes and the grid of the electrometer tube. To insure stable operation of the analyzer, especially freedom from oscillation of the light gates about their balance points, the time constants of phototube bridge response and absorption compensation by the impelling motors must be approximately matched. If the phototube response is relatively slow then the responsive motor, excited by a change in incident light or by only a momentary spurious signal, may commence to oscillate around the balance point. Conversely, if the phototube response is too fast, the responsive motor will tend to be sluggish and will not follow accurately a change in light absorption. Usually the sluggishness or oscillations may be eliminated by conducting analytical operations at radiation intensity levels producing phototube bridge currents of approximately $10^{-8}$ ampere or greater, or by adjusting the gain of the amplifier to such a point that the minimum absorption difference that it is desired to detect will produce through the amplifier a voltage barely sufficient to move the impelling motors.

It is also preferable to isolate one light path from the other by positioning a light-opaque separating wall between the two paths. Stray light effects are minimized by coating the inside surfaces of the light-tight analyzer housing with light absorptive coatings well known in the art and therefore not further described herein. Interfering light reflections may be further reduced by designing the several analytical elements of the analyzer so that a minimum of reflecting surface is exposed to the two light beams. The analyzer comprising the light source, mirrors, sample cell and any other cells, phototubes, electrometer tube, and amplifier, may be compactly housed within a single case provided with a door to permit ready accessibility to all parts requiring occasional adjustment or replacement. Since phototube sensitivity increases with the ambient temperature, it is desirable to maintain the inside of the instrument at a temperature which does not vary too widely if high accuracy during analysis is required. Adequate temperature control is conveniently secured by enclosing the phototubes within a thermally insulated box, or by the use of a conventional thermostatically-controlled auxiliary heating circuit incorporating a small fan for the circulation of air through the phototube housing as dictated by the varying heat demand.

In practice, analyzers constructed in accordance with this invention have proved to be highly sensitive. In the analysis of chlorine in air, using a sample cell of five inch length and light of 334 m$\mu$ wave-length, with full scale adjusted to 1% light absorption, it is possible to determine the presence of chlorine to an accuracy of 1.1 p. m. m. by volume.

Similarly, for cupric chloride in water solution, using a sample cell of one-half inch length and light of 800 m$\mu$ wave-length, with full scale adjusted to 20% light absorption, it is possible to determine the copper salt content when it is present in as low concentration as 0.081% by weight.

It will be understood that the analyzer of this invention may be fitted with conventional devices to assure the performance of a wide variety of process control functions corresponding to specific analytical results while still providing continuous analytical indication. It will be seen also from the foregoing detailed description that many variations may be made within the scope of this invention as defined, and it is to be understood further that we do not intend to be limited therein except as expressed in the accompanying patent claims.

We claim:

1. In a photometric analyzer adapted for the continuous chemical analysis of flowing fluid streams, by the measurement and recording of their light transmission values, comprising in combination a light-ratio measuring electric bridge circuit, a light source capable of emitting radiation of a wave-length within the range of about 200 m$\mu$ to about 1250 m$\mu$, including at least one of the wave-lengths absorbed quantitatively by the desired component of the material to be analyzed, a semi-transparent mirror in optical alignment with said light source for reflecting a portion of the incident light along a distinct sample path, an opaque mirror in optical alignment with said light source and semi-transparent mirror for reflecting a portion of the incident light passing said semi-transparent mirror along a distinct standardizing path, a light transparent sample cell interposed in the sample light path, said ratio-measuring electrical bridge circuit having two vacuum-type phototubes sensitive to radiation emitted by said light source, connected therein, with one of said phototubes disposed in the sample light path at a point past said sample cell and the other phototube disposed in the standardizing light path, regulating means responsive to the sense of electrical unbalance between said phototubes to rebalance the electrical phototube bridge circuit, means responsive to said regulating means for indicating the concentration of the sample material in said sample cell, and a second regulating means for periodically adjusting the light to restore the light influx to both phototubes to equality at zero indication of said sample concentration indicating means.

2. A photometric analyzer comprising the combination of a light source emitting radiation of a wave-length within the range of about 250 m$\mu$ to about 1250 m$\mu$, including at least one of the wave lengths absorbed quantitatively by the desired component of the material to be analyzed, a filter passing light of a quality primarily absorbed by the material to be analyzed, a semi-transparent mirror in optical alignment with said light source and filter for reflecting a portion of the incident light along one distinct path, an opaque mirror in optical alignment with said light source, filter and semi-transparent mirror for reflecting a portion of the incident light passing said last-mentioned mirror along another distinct path, one of the light paths being the sample light path and the other being the standardizing light path, a light-transparent sample cell interposed in the sample light path, a light ratio-measuring electrical bridge circuit having two vacuum-type phototubes sensitive to the radiation emitted by said light source connected in series-aiding relationship in said bridge circuit in opposition to a variable resistance provided with an adjustable tap connected to ground, with one phototube disposed in the sample light path at a point past said sample cell and the other phototube disposed in the standardizing light path, regulating means responsive to the degree and kind of electrical unbalance between said phototubes to vary the position of said adjustable tap so that the ratio of the two portions of said variable resistance is maintained substantially equal to the ratio of the resistances of said phototubes, means responsive to said regulating means for indicating the concentration of the sample material in said sample cell, and light regulating means in said standardizing light path for periodically adjusting the light in said standardizing path so that the light influx to both of said phototubes may be restored to equality at zero indication of said sample concentration indicating means.

3. A photometric analyzer according to claim 2 wherein at least one fixed resistance is series-connected with said variable resistance in opposition to said phototubes to thereby restrict the range of resistance ratio adjustment within predetermined limits.

4. A photometric analyzer comprising the combination of a light source emitting radiation of a wave-length within the range of about 250 m$\mu$ to about 1250 m$\mu$, including at least one of the wave lengths absorbed quantitatively by the desired component of the material to be analyzed, a filter passing light of a quality primarily absorbed by the material to be analyzed, a semi-transparent mirror in optical alignment with said light source and filter for reflecting a portion of the incident light along one distinct path, an opaque mirror in optical alignment with said light source, filter and semi-transparent mirror for reflecting a portion of the incident light passing said last-mentioned mirror along another distinct path, one of the light paths being the sample light path and the other being the standardizing light path, a light transparent sample cell interposed in the sample light path, means for circulating sample material at substantially constant temperature, pressure and flow rate through said sample cell, a light ratio-measuring electrical bridge circuit having two vacuum-type phototubes sensitive to the radiation emitted by said light source connected in series-aiding relationship in said bridge circuit in opposition to a variable resistance provided with an adjustable tap connected to ground, with one phototube disposed in the sample light path at a point past said sample cell and the other phototube disposed in the standardizing light path, regulating means responsive to the degree and kind of electrical unbalance between said phototubes to vary the position of said adjustable tap so that the ratio of the two portions of said variable resistance is maintained substantially equal to the ratio of the resistances of said phototubes, means responsive to said regulating means for indicating the concentration of the sample material in said sample cell and light regulating means in said standardizing light path for periodically adjusting the light in said standardizing path so that the light influx to both of said phototubes may be restored to equality at zero indication of said sample concentration indicating means.

5. A photometric analyzer according to claim 4 provided with purging-standardizing means, a light regulating means responsive to the degree and kind of electrical unbalance between said phototubes to control the amount of light passing along said standardizing path, means for cyclically discontinuing the circulation of sample material through said sample cell and for initiating the flow of purging-standardizing material through said cell, means for simultaneously returning said adjustable tap to base position, and means for temporarily rendering said light regulating means in the standardizing path responsive to the electrical unbalance between said phototubes while said purging-standardizing material is circulating through said sample cell, whereby the light influx to said phototubes is substantially restored to initial balance.

6. A photometric analyzer according to claim 4 provided with a source of supply of purging-standardizing material, means for periodically circulating purging-standardizing material at substantially constant temperature, pressure and flow rate through said sample cell, a light regulating means responsive to the degree and kind of electrical unbalance between said phototubes to control the amount of light passing along said standardizing path, means for cyclically discontinuing the circulation of sample material through said sample cell and for initiating the flow of purging-standardizing material through said cell, means for simultaneously returning said adjustable tap to base position, and means for temporarily rendering said light regulating means in the standardizing path responsive to the electrical unbalance between said phototubes while said purging-standardizing material is circulating through said sample cell, whereby the light influx to said phototubes is substantially restored to initial balance.

7. In a photometric analyzer adapted for the continuous chemical analysis of flowing fluid streams, by the measurement and recording of their light transmission values, comprising in combination a light-ratio measuring electric bridge circuit, a light source capable of emitting radiation of a wave length within the range of about 200 mμ to about 1250 mμ including at least one of the wave lengths absorbed quantitatively by the desired component of the material to be analyzed, a semi-transparent mirror in optical alignment with said light source for reflecting a portion of the incident light along a distinct sample path, an opaque mirror in optical alignment with said light source and semi-transparent mirror for reflecting a portion of the incident light passing said semi-transparent mirror along a distinct standardizing path, a light-transparent sample cell interposed in the sample light path, said ratio-measuring electrical bridge circuit having two vacuum-type phototubes, sensitive to radiation emitted by said light source, connected therein, with one of said phototubes disposed in the sample light path at a point past said sample cell and the other phototube disposed in the standardizing light path, light regulating means responsive to the sense of electrical unbalance between said phototubes to control the amount of light passing along the sample path so that a substantially constant and equal light intensity is maintained on the phototubes in both light paths, means responsive to the regulating means in said sample light path for indicating the concentration of the sample material in said sample cell, and regulating means in said standardizing light path for periodically adjusting the light in said standardizing path to restore the light influx to both photo-sensitive detectors to equality at zero indication of said sample concentration indicating means.

8. A photometric analyzer for the continuous chemical analysis of flowing fluid streams comprising the combination of a light source capable of emitting radiation of a wave-length within the range of about 200 mμ to about 1250 mμ, including at least one of the wave-lengths absorbed quantitatively by the desired component of the material to be analyzed, a semi-transparent mirror in optical alignment with said light source for reflecting a portion of the incident light along one distinct path, an opaque mirror in optical alignment with said light source and semi-transparent mirror for reflecting a portion of the incident light passing said last-mentioned mirror along another distinct path, a light transparent sample cell interposed only in one of the light paths, a source of supply of purging standardizing material, with means for periodically circulating said material at substantially constant temperature, pressure and flow rate through said sample cell, a light ratio-measuring electrical bridge circuit having two vacuum phototube detectors connected therein, with one of said detectors disposed in the light path containing the sample cell and the other of said detectors disposed in the other light path, light regulating means in said standardizing light path, responsive to the degree and kind of electrical unbalance between said phototubes, to control the amount of light passing along the standardizing path and to maintain substantially constant and equal light intensity on the phototubes in both light paths, means for cyclically discontinuing the circulation of sample material through said sample cell and for initiating the flow of purging-standardizing material through said cell, and independent means for simultaneously rendering the light regulating means in the sample light path non-responsive to the electrical unbalance between said phototubes and for returning said sample light regulating means to base position, and regulating means for temporarily rendering said independent light-regulating means in said standardizing light path responsive to the electrical unbalance between said phototubes while said purging-standardizing material is circulating through said sample cell, to substantially restore to initial balance the light influx to said phototubes.

9. The photometric analyzer of claim 8 in which the light regulating means comprises a light-opaque trapezoidal gate interposed in a normal plane across the light path transverse to the effective surface of its associated detector, to confine the shadows of the tapered edges of the gate transversely across the tube and within the longitudinal ends of the phototube.

10. The photometric analyzer of claim 8 in which the light regulating means responsive to the degree and kind of electrical unbalance comprises a light opaque trapezoidal gate having a ratio of edge thickness to mean width of about 0.006, interposed in a normal plane across the light path transverse to the effective surface of its associated detector, to confine the shadows of the tapered edges of the gate transversely across the tube and within the longitudinal ends of the phototube.

11. The photometric analyzer of claim 1 in which the regulating means comprises a light-opaque trapezoidal gate interposed in a normal plane across the light path transverse to the effective surface of its associated detector.

12. The photometric analyzer of claim 1 in which the regulating means comprises a light-opaque trapezoidal gate having a ratio of edge thickness to mean width of about 0.006, interposed in a normal plane across the light path transverse to the effective surface of its associated detector.

13. The analyzer of claim 7 wherein the light controlling means in the measuring light path comprises a linear gate capable of regulating the intensity, or light flux that said gate transmits at a magnitude that varies linearly with the displacement of the gate, means for continuously adjusting the position of the light regulating means to maintain equality of light influx to both said phototubes, and means for continuously indicating the position of said light regulating means to thereby indicate said sample concentration.

References Cited in the file of this patent

UNITED STATES PATENTS

| Number | Name | Date |
|---|---|---|
| Re. 23,023 | Wolf et al. | Aug. 3, 1948 |
| 1,794,222 | Whitney | Feb. 24, 1931 |
| 1,881,336 | Voigt | Oct. 4, 1932 |
| 1,919,182 | Fitz Gerald | July 18, 1933 |
| 1,977,359 | Styer | Oct. 16, 1934 |
| 2,019,871 | Pettingill et al. | Nov. 5, 1935 |
| 2,080,613 | Lange | May 18, 1937 |
| 2,157,389 | Park | May 9, 1939 |
| 2,198,971 | Neufeld | Apr. 30, 1940 |
| 2,244,732 | Schmidt | June 10, 1941 |
| 2,246,001 | Powers | June 17, 1941 |
| 2,349,125 | Turner | May 16, 1944 |
| 2,389,046 | Hare | Nov. 13, 1945 |
| 2,408,023 | Kruper | Sept. 24, 1946 |
| 2,431,899 | Wolf et al. | Dec. 2, 1947 |
| 2,437,715 | Thorp et al. | Mar. 16, 1948 |
| 2,439,373 | Stearns, Jr. | Apr. 6, 1948 |
| 2,444,675 | Rath | July 6, 1948 |
| 2,501,365 | Varden | Mar. 21, 1950 |

OTHER REFERENCES

Colorimetry: Radio News; June 1944, pages 25, 26, 27, 56, 58, 60 and 71; publication to Shurkus.